United States Patent
Feng et al.

(10) Patent No.: US 12,129,010 B2
(45) Date of Patent: Oct. 29, 2024

(54) CONTROL SYSTEM OF DAMPER OF VARIABLE-AIR-VOLUME AIR DISTRIBUTOR AND CONTROL METHOD THEREOF

(71) Applicant: Jiangsu university of science and technology, Jiangsu (CN)

(72) Inventors: Guozeng Feng, Jiangsu (CN); Bo Meng, Jiangsu (CN); Guozhi Bao, Jiangsu (CN); Xinxin Gu, Jiangsu (CN); Chen Gu, Jiangsu (CN); Tong Xu, Jiangsu (CN)

(73) Assignee: Jiangsu university of science and technology, Jiangsu (CN)

( * ) Notice: Subject to any disclaimer, the term of this patent is extended or adjusted under 35 U.S.C. 154(b) by 617 days.

(21) Appl. No.: 17/439,812

(22) PCT Filed: Mar. 23, 2021

(86) PCT No.: PCT/CN2021/082253
§ 371 (c)(1),
(2) Date: Sep. 16, 2021

(87) PCT Pub. No.: WO2022/062339
PCT Pub. Date: Mar. 31, 2022

(65) Prior Publication Data
US 2022/0306265 A1    Sep. 29, 2022

(30) Foreign Application Priority Data
Sep. 23, 2020 (CN) .......................... 202011011502.6

(51) Int. Cl.
*F24F 11/755* (2018.01)
*B60H 1/00* (2006.01)
(Continued)

(52) U.S. Cl.
CPC ............ *B63J 2/04* (2013.01); *B60H 1/00792* (2013.01); *B60H 1/00835* (2013.01);
(Continued)

(58) Field of Classification Search
USPC .......................................................... 700/278
See application file for complete search history.

(56) References Cited

U.S. PATENT DOCUMENTS 5,579,993 A * 12/1996 Ahmed .................... F24F 11/30
236/78 D
2001/0003904 A1    6/2001 Hamery et al.
(Continued)

FOREIGN PATENT DOCUMENTS

CN    102353119 A  *  2/2012
CN    109533264        3/2019
(Continued)

*Primary Examiner* — Hien D Khuu
(74) *Attorney, Agent, or Firm* — JCIP GLOBAL INC.

(57) ABSTRACT

Disclosed is a control method of a damper of a variable-air-volume air distributor and a control system thereof, mainly comprising a volume adjusting valve for the variable-air-volume air distributor, a valve actuator, a BP neural network-based main controller, a data collector and a user operation panel. The control method thereof is to use, mainly based on the collected room temperature and static pressure at the inlet of the air distributor, the BP neural network predictive model to establish a nonlinear model of temperature & static pressure and valve opening, perform training and optimization, and optimize the output valve opening to obtain and label an optimal value as the set value of the controller to control the action of the valve actuator, thereby realizing an automatic variable air volume.

7 Claims, 6 Drawing Sheets

(51) Int. Cl.
*B63J 2/04* (2006.01)
*F24F 11/63* (2018.01)
*F24F 110/10* (2018.01)
*F24F 110/40* (2018.01)

(52) U.S. Cl.
CPC ............ *F24F 11/63* (2018.01); *F24F 11/755* (2018.01); *F24F 2110/10* (2018.01); *F24F 2110/40* (2018.01)

(56) References Cited

U.S. PATENT DOCUMENTS

| | | | | |
|---|---|---|---|---|
| 2001/0042792 | A1* | 11/2001 | Kline | F24F 11/64 454/256 |
| 2005/0006488 | A1* | 1/2005 | Stanimirovic | F24F 11/74 236/49.1 |

FOREIGN PATENT DOCUMENTS

| | | | | |
|---|---|---|---|---|
| CN | 109798646 | A | * | 5/2019 |
| CN | 110441065 | | | 11/2019 |
| CN | 111059690 | A | * | 4/2020 |
| CN | 111288610 | | | 6/2020 |
| CN | 111288610 | A | * | 6/2020 |
| CN | 112093025 | | | 12/2020 |
| CN | 113446683 | A | * | 9/2021 |
| JP | H09210434 | A | * | 8/1997 |
| JP | 2005127636 | A | * | 5/2005 |
| JP | 2013221427 | | | 10/2013 |
| JP | 2019203670 | A | * | 11/2019 |
| WO | WO-2015074573 | A1 | * | 5/2015 |
| WO | WO-2019040067 | A1 | * | 2/2019 |

\* cited by examiner

CONTROL SYSTEM OF DAMPER OF VARIABLE-AIR-VOLUME AIR DISTRIBUTOR AND CONTROL METHOD THEREOF

CROSS-REFERENCE TO RELATED APPLICATION

This application is a 371 of international application of PCT application serial no. PCT/CN2021/082253, filed on Mar. 23, 2021, which claims the priority benefit of China application no. 202011011502.6, filed on Sep. 23, 2020. The entirety of each of the above mentioned patent applications is hereby incorporated by reference herein and made a part of this specification.

TECHNICAL FIELD

The present invention relates to the technical field of industrial control, and in particular to a control system of a damper of a variable-air-volume air distributor and a control method thereof.

BACKGROUND

In recent years, the ship industry at home and abroad is actively carrying out technological transformations in terms of low noise, energy saving, environmental protection, and intelligence. Air distributor, as a common marine air conditioner terminal, acts as a terminal diffuser in an air supply system of an air conditioner, and is a throttling-type variable-air-volume terminal device. The so-called variable-air-volume is the ability to automatically adjust the air volume and automatically match the air volume required by the cabin temperature demand according to a change in an indoor load. With the development of variable-air-volume air conditioning system technology and the continuous improvement of global awareness of energy conservation, the demand for variable-air-volume air distributors as a new generation of ship supporting products has surged.

A variable-air-volume control system of a variable-air-volume air distributor is the key link to ensure the automatic variable-air-volume air supply. For the research of variable-air-volume control systems, Shanghai Johnson Controls, Co., Ltd. uses proportional band adaptive and pattern recognition adaptive control algorithms, Siemens and York directly use PID control, and Honeywell uses PID control and adaptive control methods. Chen Jiongde, et al. of Shanghai Jiao Tong University proposed a nonlinear model predictive control for variable-air-volume (VAV) systems. This control method uses a nonlinear autoregressive network (NARX) with exogenous input and a particle swarm optimization algorithm (PSO). NARX is intended to predict controlled parameters (room temperature) of the VAV system, and PSO acts as an optimizer to obtain the optimal control variables of the VAV system.

BP (Back-Propagation) neural network, as a network structure with strong nonlinear mapping ability and flexibility, is mainly used in function approximation, pattern recognition, classification application, data compression and so on. Jia Chao of the University of Science and Technology Beijing researched a multi-mode adaptive control method based on neural network, and proposed an adaptive controller based on OEM-ELM neural network, which has good adaptability to a sudden change of a controlled object parameter, with a transient error of the system being better controlled. Thus, it can be seen that the BP neural network prediction model has a high practical application value in the actual production process.

Therefore, the improvement and optimization of a control system of a damper of a variable-air-volume air distributor aims to ensure that the variable-air-volume air supply is more stable, to improve the degree of automation of equipment, to reduce the loss of equipment, and to reduce energy consumption. It is of great significance to promote the development of domestic air distributor products.

SUMMARY

In view of the problems in the variable-air-volume control system of the variable-air-volume air distributor in the prior art, the present invention provides a BP neural network-based damper control system and a control method thereof.

The specific technical solutions used by the present invention are as follows:

A control system of a damper of a variable-air-volume air distributor, comprising a volume adjusting valve for the variable-air-volume air distributor, a valve actuator, a BP neural network-based main controller, a data collector and a user operation panel, where a signal of a set temperature of the user operation panel is connected to an input of the main controller, the data collector collects room temperature and a static pressure at an inlet of the air distributor, the collected data is connected to the input of the main controller through different sensors, and an output of the main controller is connected to an input of the valve actuator.

In the above technical solution, the BP neural network-based main controller includes a BP neural network predictive control module and a proportional adjustment control module; the data collector includes a temperature sensor and a pressure sensor.

In the above technical solution, the BP neural network predictive control module is a dual-input single-output module; and by setting two inputs of the neural network model for the opening action of the damper as a static pressure u and a demanded air volume v within an air duct, respectively, and one output as a valve opening y, the established mathematical model of the damper opening action is as follows:

$$\begin{cases} \text{net}_j^{(2)}(k) = \sum_{k=1}^{m} w_{ji}^{(2)} O_i^{(1)} - \theta_j \\ O_j^{(2)}(k) = f[\text{net}_j^{(2)}(k)] \end{cases} \quad (1)$$

$$\begin{cases} \text{net}_l^{(3)}(k) = \sum_{j=1}^{k} w_{jl}^{(3)} O_j^{(1)} - \theta_l \\ O_l^{(3)}(k) = g[\text{net}_l^{(3)}(k)] \end{cases}$$

$$y = f(f([u, v][w_1(i), w_2(j), w_3(k)]))$$

In formula (1), m is the number of neurons in the input layer, and k is the number of neurons in the output layer, $$\tanh(x) = \frac{\sinh(x)}{\cosh(x)} = \frac{e^x - e^{-x}}{e^x + e^{-x}}; g(x) = \frac{1}{1 + e^{-x}};$$

the output value of the above model is continuously corrected by a negative gradient descent method, and the error function calculation formula is:

$$E(n) = \sum_{k=1}^{L} \frac{1}{2} [r_k(n) - y_k(n)]^2 \quad (2)$$

In formula (2), $r_k(n)$ is an expected output value, and $y_k(n)$ is an actual output value. A control method for a control system of a damper of a variable-air-volume air distributor, comprising the specific steps:

step 1. a data collector collects in real-time room temperature, a set temperature of a user operation panel and a static pressure at an inlet of the air distributor, and inputs same to a main controller;

step 2: the input temperature signal is converted into an air volume signal within the main controller;

step 3. the data is passed to the main controller, and first is matched for operating conditions in a storage unit, and if the matching is successful, proceed to step 5; otherwise, proceed to step 4, on-line modeling learning;

step 4. a neural network model of the damper opening action is modeled and trained by a BP neural network predictive model module according to the input data, and a corresponding input-output mapping is established;

step 5: the main controller outputs the control parameters optimized by the BP neural network model module to a proportional adjustment control module, and then controls the action of a valve actuator to realize an automatic variable-air-volume.

The temperature signal in the step 2 above includes the collected room temperature and set temperature of the user operation panel.

The control method in the step 3 above has two functions: on-line modeling learning and off-line matching operating conditions, where the matched operating conditions are the prediction models constructed from sample data of the factory test, which are stored within the main controller after training and learning.

The step 4 above includes the following processes:

A1. the calculation of the BP neural network predictive model module is to establish a mathematical model based on the data obtained by the data collector, and the learning is to verify the effectiveness of the modeling based on the set temperature of the user operation panel;

A2. the BP neural network prediction model module corrects and optimizes a nonlinear model established by the module according to the verification results;

A3. the BP neural network prediction model module stores the optimized results in the storage unit of the main controller.

In step 4, the damper opening action comprises a damper forward action and a damper reverse action.

The beneficial effects of the present invention: The present invention provides a control method for the opening of a damper of a variable-air-volume air distributor and a control system thereof. Compared to the prior art, the present invention makes full use of advanced control theory, neural network, and predictive control, intelligent algorithms, etc., to realize monitoring, modeling, control, optimization, management and decision of the control system of the damper of the variable-air-volume air distributor, avoiding frequent operation of the damper due to temperature fluctuations and achieving the purpose of automatic variable-air-volume, which is of great significance for improving user comfort and reducing energy consumption.

DETAILED DESCRIPTION

In order to deepen the understanding of the present invention, the present invention will be further described in detail below with reference to the accompanying drawings and an embodiment. The embodiment is only used to explain the present invention and does not limit the protection scope of the present invention.

The present invention is directed to a control system of a damper of a variable-air-volume air distributor, and the adjustment of the variable-air-volume damper is the key of the control system. Traditional feedback control has slow response speed and frequent valve actuator actions. By analyzing the principle of variable-air-volume, the present invention uses a BP neural network prediction model to establish a nonlinear model of temperature & static pressure and valve opening according to a collected room temperature and a static pressure at an inlet of the air distributor. According to the established neural network model, an optimization algorithm is used to optimize the output valve opening, to obtain the optimal value under this operating condition, which is labeled as the set value of the controller to control the action of the valve actuator, to realize the automatic variable-air-volume.

Figure 1:
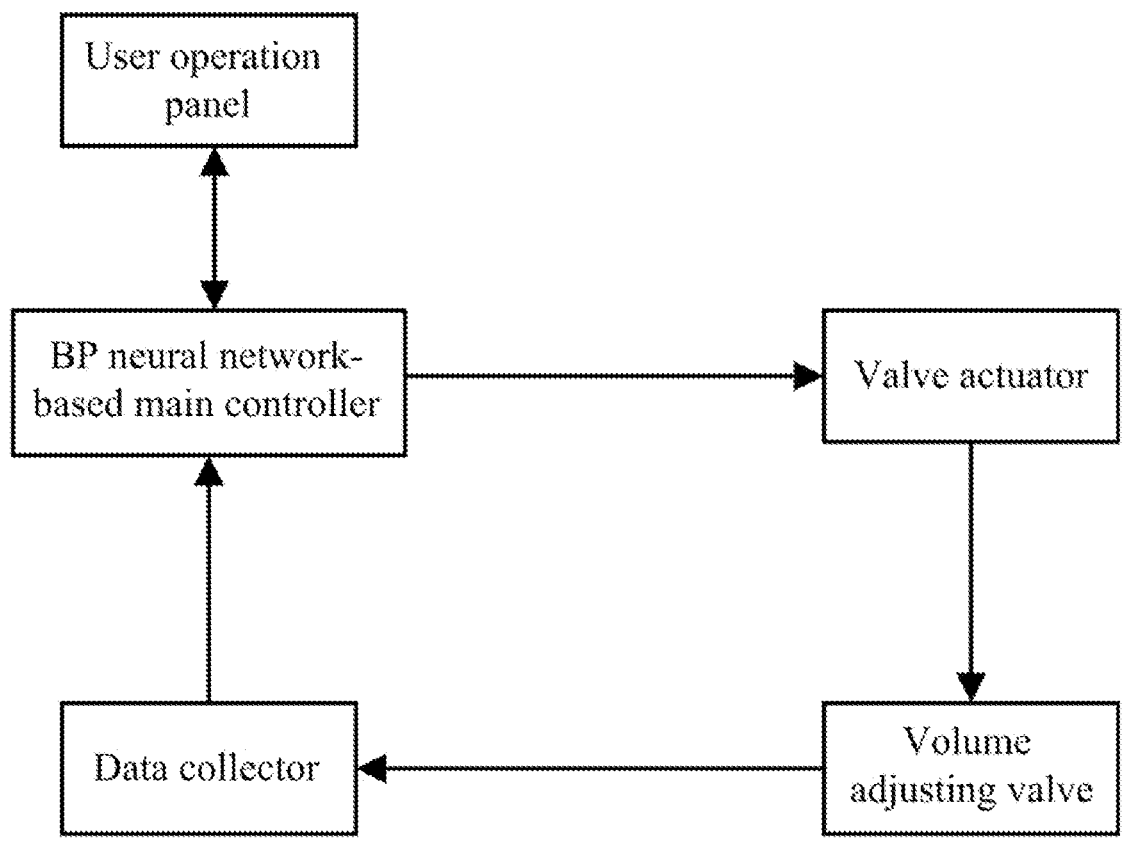
FIG. 1 is a block diagram of a control system in the present invention.

FIG. 1 is a block diagram of the control system of the damper of the variable-air-volume air distributor in the present invention, including a volume adjusting valve, a valve actuator, a user operation panel, a data collector, and a BP neural network-based main controller (a BP neural network predictive model module and a proportional adjustment control module). The data collector is connected to an input of the main controller, and an output of the main controller is connected to the valve actuator and the user operation panel, respectively.

The working process of the system is that: room temperature is measured by the data collector, and is converted into air volume in the main controller and the air volume is passed to the BP neural network predictive model module; a static pressure in the pipeline is measured by a pressure sensor at an inlet of the air distributor, and a static pressure signal is passed to the BP neural network prediction model module. After neural network modeling and calculation with the demanded air volume and the static pressure signal as two inputs, the main controller first judges the valve adjustment direction to select the forward stroke or reverse stroke model, predicts the valve opening, and feeds same back to the main controller and sends instructions to the valve actuator. After receiving the instruction of the controller, the valve actuator directly moves to a position of the predicted valve opening, to finally achieve the purpose of automatic variable air volume.

Figure 2:
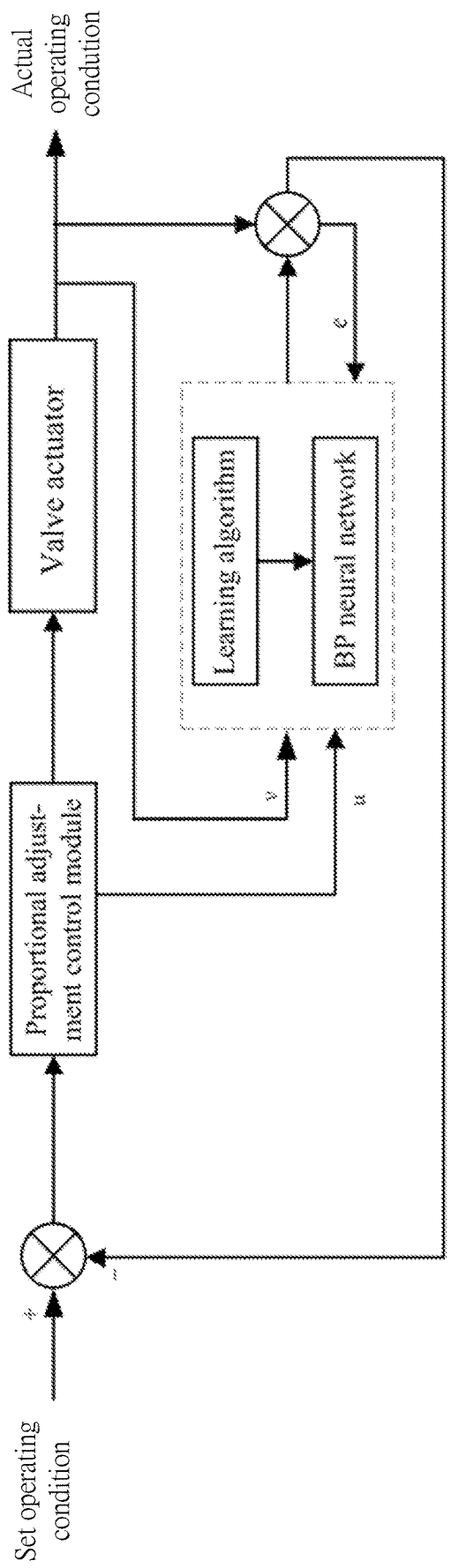
FIG. 2 is a schematic diagram of the control method in the present invention.
Figure 3:
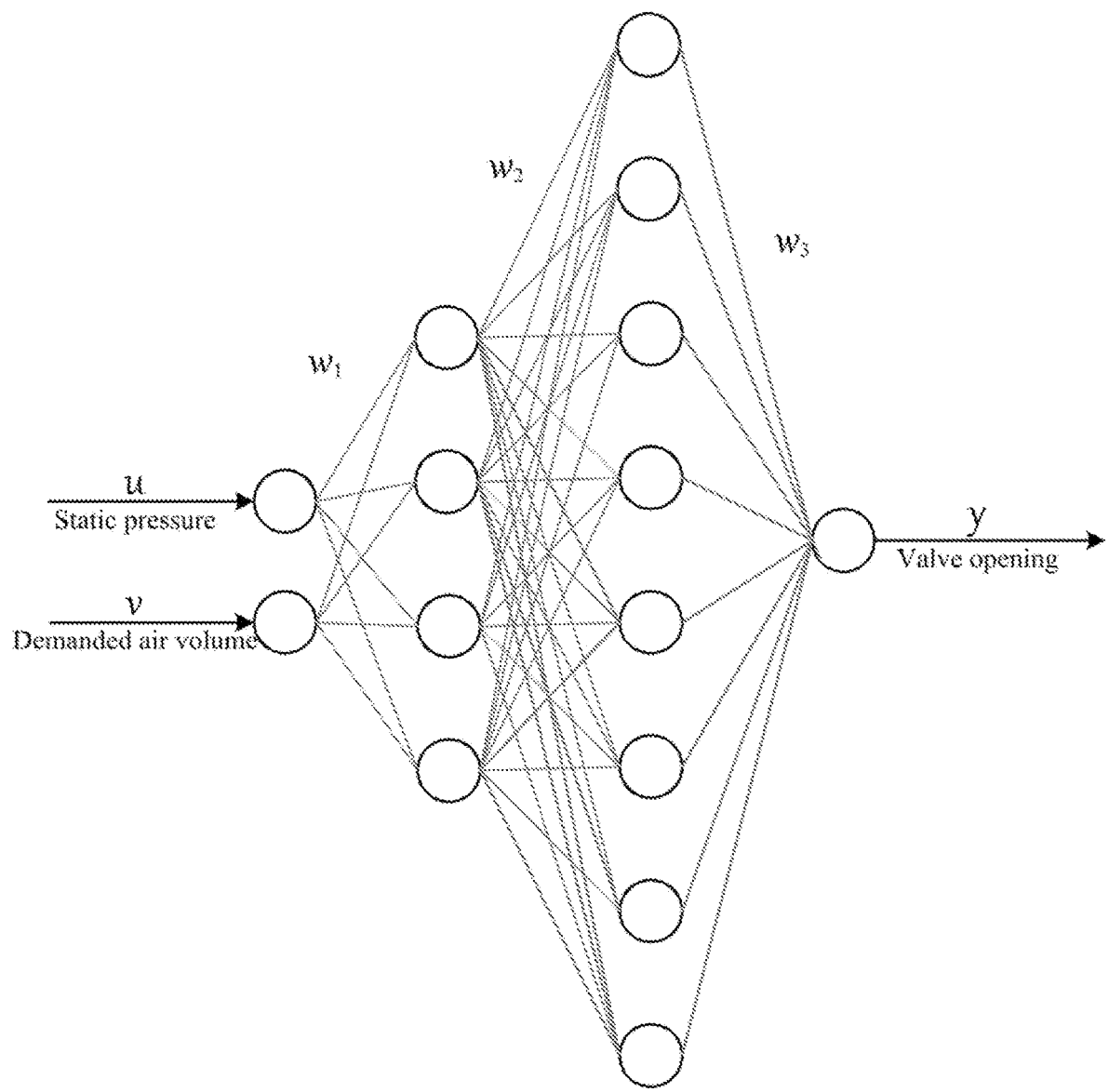
FIG. 3 is a diagram of the structure of a BP neural network of the control method in the present invention.
Figure 4:
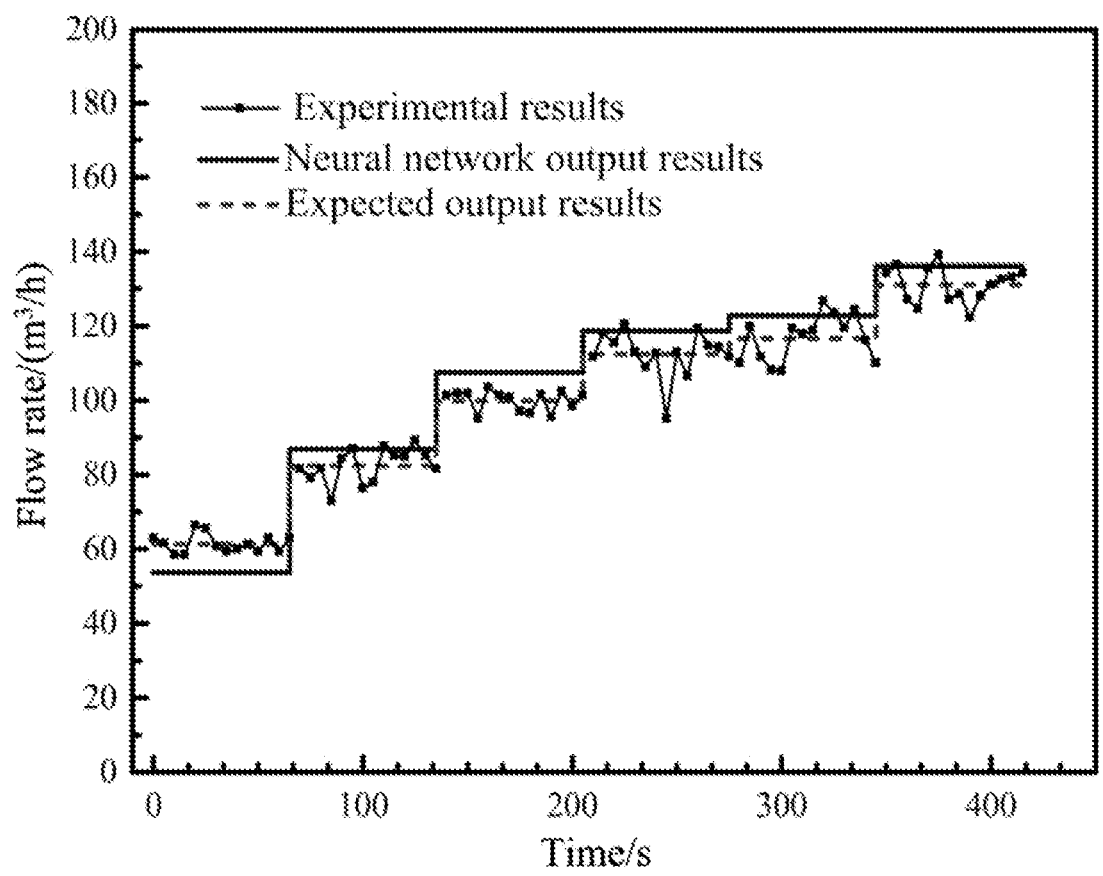
FIG. 4 is a diagram of the prediction result of a network model valve opening degree of 40% v.s. an actual air volume in the present invention.
Figure 5:
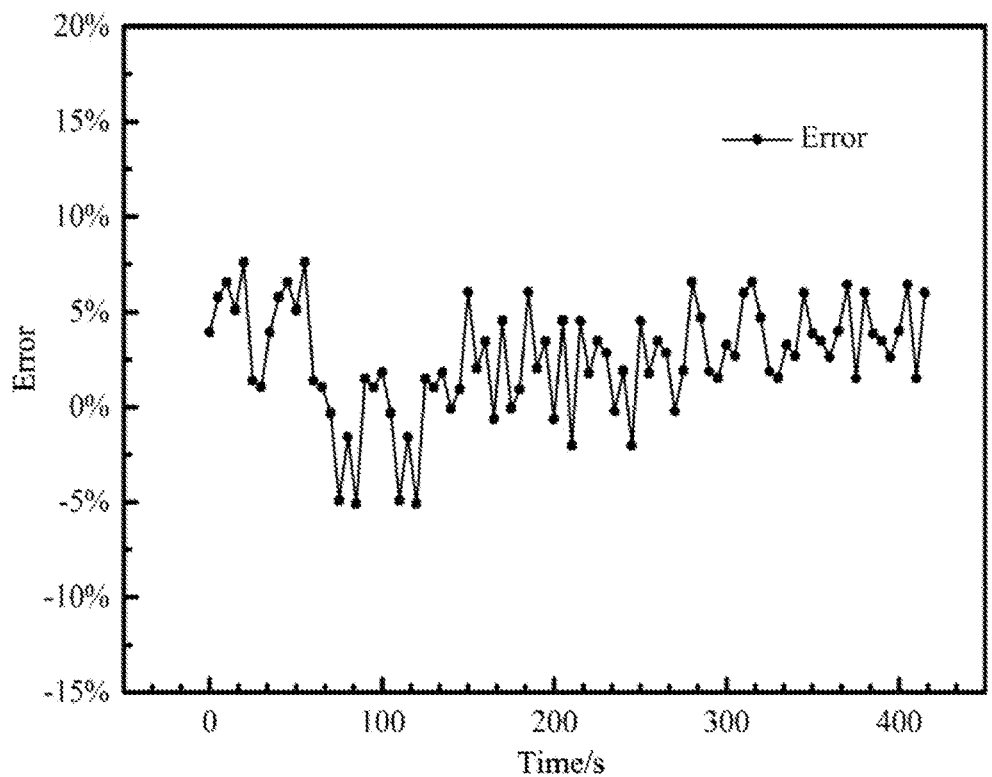
FIG. 5 is a diagram of the prediction error of a network model valve opening degree of 40% v.s. an actual air volume in the present invention.
Figure 6:
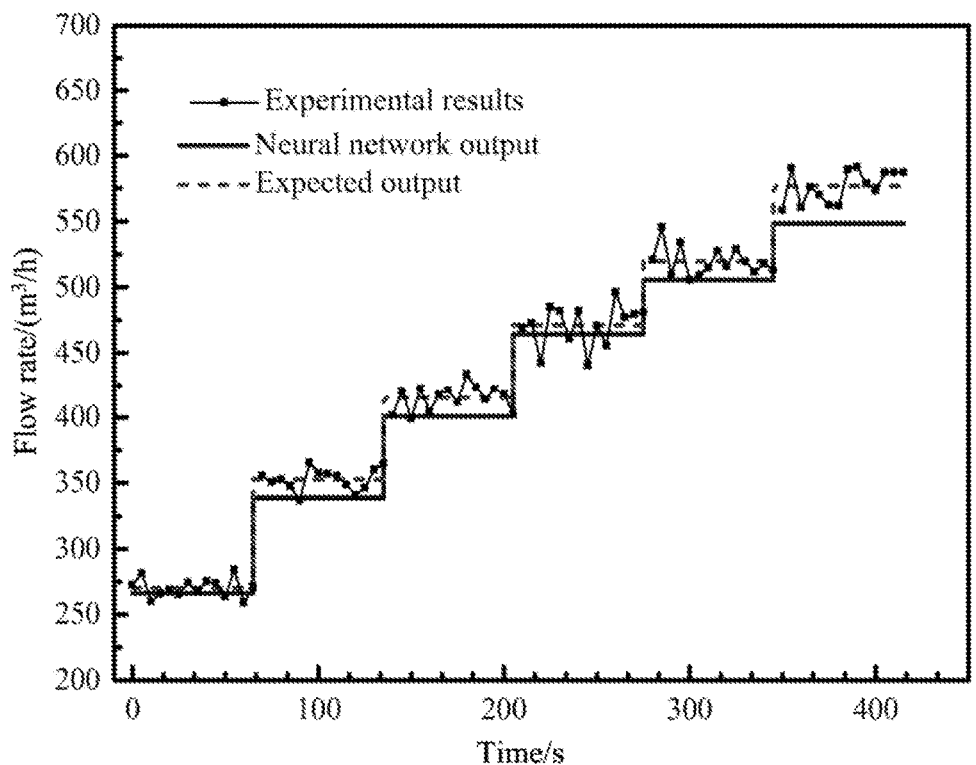
FIG. 6 is a diagram of the prediction result of a network model valve opening degree of 65% v.s. an actual air volume in the present invention.
Figure 7:
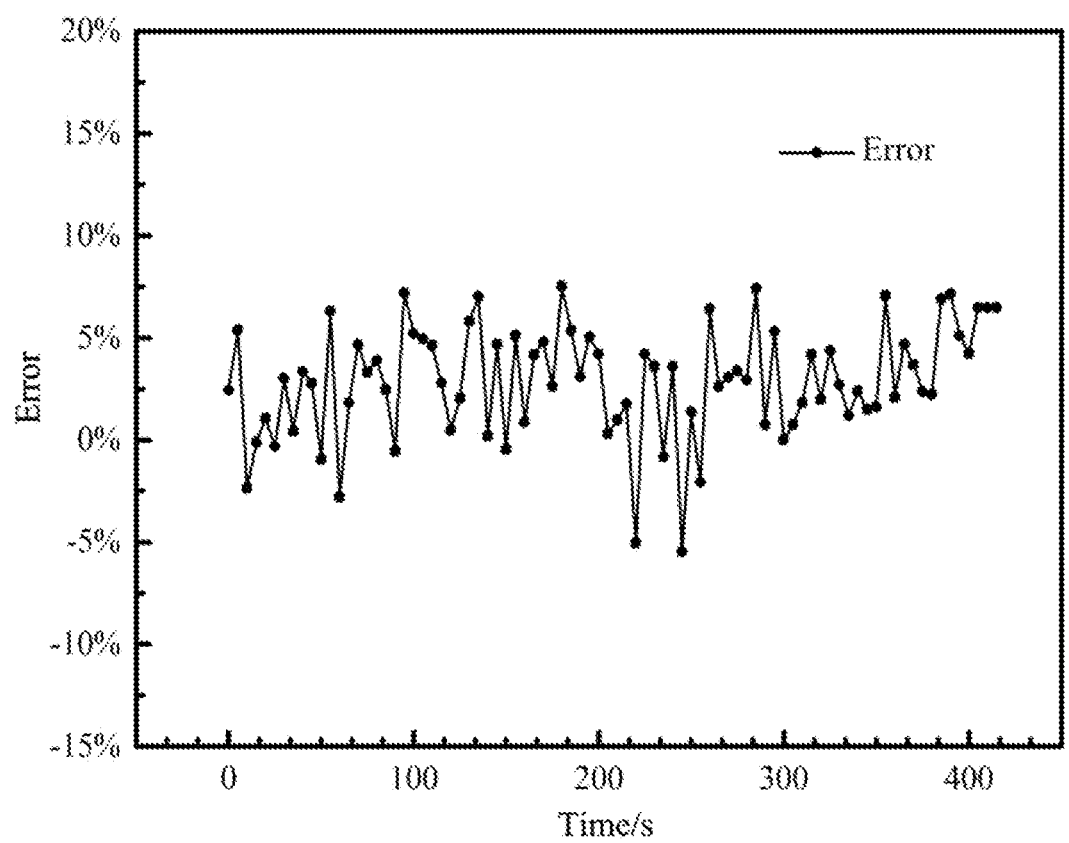
FIG. 7 is a diagram of the prediction error of a network model valve opening degree of 65% v.s. an actual air volume in the present invention.

FIG. 2 is a schematic diagram of a control method of the damper of the variable-air-volume air distributor of the present invention. The working principle thereof is that: the proportional adjustment control module is mainly used to receive data from the data collector, and establish the action process and correction of the valve actuator. The BP neural network predictive model module uses the received air volume and static pressure sample data to establish a non-linear mathematical model with a neural network learning algorithm and perform simulation; complete the calculation and learning of the neural network by comparing to the set temperature of the user operation panel, and then feed the sample data back to the proportional adjustment control module for correction.

Further, the BP neural network predictive model is a dual-input single-output model;

two inputs of the neural network model of the damper opening action are a static pressure u and a demanded air volume v within an air duct, respectively, and one output is a valve opening y. The established mathematical model of the damper opening action is as follows:

$$\begin{cases} \text{net}_j^{(2)}(k) = \sum_{k=1}^{m} w_{ji}^{(2)} O_i^{(1)} - \theta_j \\ O_j^{(2)}(k) = f[\text{net}_j^{(2)}(k)] \end{cases} \quad (1)$$

$$\begin{cases} \text{net}_l^{(3)}(k) = \sum_{j=1}^{k} w_{jl}^{(3)} O_j^{(1)} - \theta_l \\ O_l^{(3)}(k) = g[\text{net}_l^{(3)}(k)] \end{cases}$$

$$y = f(f([u,v][w_1(i), w_2(j), w_3(k)]))$$

In formula (1), m is the number of neurons in the input layer, and k is the number of neurons in the output layer, $$\tanh(x) = \frac{\sinh(x)}{\cosh(x)} = \frac{e^x - e^{-x}}{e^x + e^{-x}}; g(x) = \frac{1}{1+e^{-x}};$$

the output value of the above model is continuously corrected by a negative gradient descent method, and the error function calculation formula is:

$$E(n) = \sum_{k=1}^{L} \frac{1}{2}[r_k(n) - y_k(n)]^2 \quad (2)$$

In formula (2), $r_k(n)$ is an expected output value, and $y_k(n)$ is an actual output value.

The specific steps of a control method for automatic variable air volume of the air distributor comprise: 1. a data collector collects in real-time room temperature, a set temperature of a user operation panel and a static pressure at an inlet of the air distributor, and inputs same to a main controller;

2. the input temperature signal is converted into an air volume signal within the main controller;

3. the data is passed to the main controller, and first is matched for preset operating conditions in a storage unit, and if the matching is successful, proceed to step 5; otherwise, proceed to step 4, on-line modeling learning;

4. a neural network model of the damper opening action is modeled and trained by a BP neural network predictive model module according to the input data, and a corresponding input-output mapping is established;

5. the main controller outputs the control parameters optimized by the BP neural network model module to a proportional adjustment control module, and then controls the action of a valve actuator to realize an automatic variable-air-volume.

Further, the temperature signal in the step 2 above includes the collected room temperature and set temperature of the user operation panel.

Further, the present control method has two functions: on-line modeling learning and off-line matching operating conditions. The matched operating conditions in the step 3 are the prediction models constructed from sample data of the factory test, which are stored within the main controller after training and learning. Further, the step 4 comprises:

A1. the calculation of the BP neural network predictive model module is to establish a mathematical model based on the data obtained by the data collector, and the learning is to verify the effectiveness of the modeling based on the set temperature of the user operation panel;

A2. the BP neural network prediction model module corrects and optimizes a nonlinear model established by the module according to the verification results;

A3. the BP neural network prediction model module stores the optimized results in the storage unit of the main controller.

Further, in the step 4, the damper opening action comprises a damper forward action and a damper reverse action.

Embodiment

By means of the functions of formula (1) and formula (2) and the data collected by experiments, the established dual-input single-output neural network predictive model is trained for the forward and reverse actions of the damper, and the calculation results of connection weights and thresholds of the trained network structure are shown in the table below.

Neuron connection weights and thresholds of the trained neural network

| Adjustment direction | $w_1(i)$ | a(i) | $w_2(j)$ | | | | b(j) | $w_3(k)$ | c |
|---|---|---|---|---|---|---|---|---|---|
| Forward stroke | 1.875 | 7.281 | 0.688 | −1.097 | −1.043 | 1.071 | −1.037 | −1.318 | −2.545 |
|  | 1.120 |  | 0.480 | 4.561 | 2.908 | 1.002 | −3.044 | −1.291 |  |
|  | −1.950 | −0.411 | −0.094 | 4.464 | 0.360 | 1.523 | −6.446 | −2.109 |  |
|  | −1.932 |  | 4.680 | 1.009 | −1.202 | −0.934 | 7.258 | 0.162 |  |
|  | 0.310 | −0.181 | −3.516 | −2.483 | 1.513 | −2.304 | −0.560 | −1.005 |  |
|  | −0.025 |  | 1.935 | −3.741 | 0.253 | −1.588 | 3.632 | −2.692 |  |
|  | 0.678 | −1.135 | −0.360 | 1.071 | 0.030 | −0.527 | 1.037 | 5.397 |  |
| Reverse stroke | 3.839 | −3.444 | 3.570 | 0.057 | −0.795 | −2.319 | −2.774 | −0.581 | −0.545 |
|  | 0.158 |  | 2.038 | 2.103 | 1.308 | −1.547 | −1.649 | 1.060 |  |
|  | −0.527 | −0.084 | −0.301 | −2.637 | 4.850 | 5.736 | −0.868 | 0.014 |  |
|  | −1.176 |  | 1.130 | 1.370 | 0.327 | −0.466 | 0.392 | 0.901 |  |
|  | −0.408 | −0.807 | 1.003 | 4.049 | 4.271 | −1.153 | 2.248 | −0.139 |  |
|  | 0.818 |  | 1.779 | −4.349 | −3.257 | −2.283 | −1.689 | −0.078 |  |

-continued

| Adjustment direction | $w_1(i)$ | a(i) | $w_2(j)$ | | | b(j) | $w_3(k)$ | c |
|---|---|---|---|---|---|---|---|---|
| | −0.426 | −1.144 | 1.419 | −0.778 | −2.050 | 0.656 | 0.412 | −0.646 |
| | −1.541 | | −0.023 | 2.205 | −0.129 | −0.312 | 2.466 | 1.459 |

The above neuron connection weights and thresholds are used depending on different given static pressure commands. When the input demanded air volume assumes a step change, the prediction results of the actual air volume by the network model are as shown in FIG. 4-7.

For a specific opening of the damper, the larger the static pressure is, the larger the prediction error is; the smaller the static pressure, the smaller the prediction error. In the daily use of marine air distributors, the use at the operating conditions of small static pressure and small flow accounts for a large proportion, and the model will have a good predictive effect in most cases. The error calculation results show that there is a good follow effect between the actual neural network output and the expected output, with an average error being within 5%.

The control system of the damper of the variable-air-volume air distributor and the control method thereof provided by the present invention can realize design optimization and transformation of the variable-air-volume control system of the existing variable-air-volume air distributor on the market, enhance the degree of automation of the air distributor, and are of great significance for improving the comfortableness of living in the cabin and reducing equipment energy consumption.

The basic principles, main features and advantages of the present invention have been shown and described above. Those skilled in the art should understand that the present invention is not limited to the foregoing embodiment. The foregoing embodiment and the description in the specification are only intended to illustrate the principles of the present invention. Various variations and improvements may further be made to the present invention without departing from the spirit and scope of the present invention. Such variations and improvements all fall within the scope claimed by the present invention. The scope claimed by the present invention is bounded by claims and their equivalents.

What is claimed is:

1. A control system of a damper of a variable-air-volume air distributor, comprising a volume adjusting valve for the variable-air-volume air distributor, a valve actuator, a BP (Back-Propagation) neural network-based main controller, a data collector and a user operation panel, wherein a signal of a set temperature of the user operation panel is connected to an input of the BP neural network-based main controller, the data collector collects room temperature and a static pressure at an inlet of the variable-air-volume air distributor, the collected data is connected to the input of the BP neural network-based main controller through different sensors, and an output of the BP neural network-based main controller is connected to an input of the valve actuator;

wherein the BP neural network-based main controller comprises a BP neural network predictive control module;

wherein the BP neural network predictive control module is a dual-input single-output module; and by setting two inputs of the BP neural network model for an opening action of the damper as a static pressure u and a demanded air volume v within an air duct, respectively, and one output as a valve opening y, the established mathematical model of the opening action of the damper is as follows:

$$\begin{cases} \text{net}_j^{(2)}(k) = \underset{i=1}{\overset{m}{\text{Math.}}} \, w_{ji}^{(2)} O_i^{(1)} - \theta_j \\ O_j^{(2)}(k) = f[\text{net}_j^{(2)}(k)] \end{cases} \quad (1)$$

$$\begin{cases} \text{net}_l^{(3)}(k) = \underset{j=1}{\overset{k}{\text{Math.}}} \, w_{jl}^{(3)} O_j^{(1)} - \theta_l \\ O_l^{(3)}(k) = g[\text{net}_l^{(3)}(k)] \end{cases}$$

$$y = f(f([u, v][w_1(i), w_2(j), w_3(k)]))$$

in formula (1), m is the number of neurons in the input layer, and k is the number of neurons in the output layer, $$\tanh(x) = \frac{\sinh(x)}{\cosh(x)} = \frac{e^x - e^{-x}}{e^x + e^{-x}}; g(x) = \frac{1}{1 + e^{-x}},$$

the output value of the above model is continuously corrected by a negative gradient descent method, and the error function calculation formula is:

$$E(n) = \Sigma_{k=1}^{l} \tfrac{1}{2} |r_k(n) - y_k(n)|^2 \quad (2)$$

in formula (2), $r_k(n)$ is an expected output value, and $y_k(n)$ is an actual output value" or "wherein the control method comprises two functions: on-line modeling learning and off-line matching operating conditions, wherein the matched operating conditions are the prediction models constructed from sample data of the factory test, which are stored within the main controller after training and learning.

2. The control system of a damper of a variable-air-volume air distributor according to claim 1, wherein the BP neural network-based main controller further comprises a proportional adjustment control module.

3. The control system of a damper of a variable-air-volume air distributor according to claim 2, wherein the data collector comprises a temperature sensor and a pressure sensor.

4. A control method for a control system of a damper of a variable-air-volume air distributor, comprising the specific steps:

collecting a room temperature in real-time through a data collector, a set temperature of a user operation panel and a static pressure at an inlet of the air distributor, and inputting the collected room temperature, the set temperature of the user operation panel and the static pressure at the inlet of the air distributor to a main controller;

converting the input collected room temperature signal into an air volume signal within the main controller;

matching the collected room temperature, the set temperature of the user operation panel and the static pressure at the inlet of the air distributor to operating conditions in a storage unit;

outputting control parameters optimized by a (Back-Propagation) BP neural network model module to a proportional adjustment control module through the main controller, and then controlling an action of a valve actuator to realize an automatic variable-air-volume in response to the operating conditions is matched; and modeling and training a neural network model of the damper opening action through the BP neural network predictive model module according to the collected room temperature, the set temperature of the user operation panel and the static pressure at the inlet of the air distributor input to the main controller, and establishing a corresponding input-output mapping for modeling on line learning in response to the operating conditions is unmatched;

wherein the control method comprises two functions: on-line modeling learning and off-line matching operating conditions, wherein the matched operating conditions are the prediction models constructed from sample data of the factory test, which are stored within the main controller after training and learning.

5. The control method for a control system of a damper of a variable-air-volume air distributor according to claim 4, wherein the temperature signal comprises the collected room temperature and set temperature of the user operation panel.

6. The control method for a control system of a damper of a variable-air-volume air distributor according to claim 4, wherein the step of modeling and training the neural network model of the damper opening action through the BP neural network predictive model module according to the input data, and establishing a corresponding input-output mapping comprises: the calculation of the BP neural network predictive model module is to establish a mathematical model based on the data obtained by the data collector, and the learning is to verify the effectiveness of the modeling based on the set temperature of the user operation panel; the BP neural network prediction model module corrects and optimizes a nonlinear model established by the module according to the verification results; and the BP neural network prediction model module stores the optimized results in the storage unit of the main controller.

7. The control method for a control system of a damper of a variable-air-volume air distributor according to claim 4, wherein the damper opening action comprises a damper forward action and a damper reverse action.

\* \* \* \* \*